(12) United States Patent
Smith

(10) Patent No.: US 9,035,116 B2
(45) Date of Patent: May 19, 2015

(54) BIOMASS FEED SYSTEM INCLUDING GAS ASSIST

(75) Inventor: Edward J. Smith, Houston, TX (US)

(73) Assignee: KiOR, Inc., Pasadena, TX (US)

( * ) Notice: Subject to any disclaimer, the term of this patent is extended or adjusted under 35 U.S.C. 154(b) by 140 days.

(21) Appl. No.: 13/568,994

(22) Filed: Aug. 7, 2012

(65) Prior Publication Data

US 2014/0044602 A1 Feb. 13, 2014

(51) Int. Cl.
| | | |
|---|---|---|
| C07C 1/32 | (2006.01) |
| C10B 31/00 | (2006.01) |
| B65G 53/16 | (2006.01) |
| B65G 33/08 | (2006.01) |
| C10B 49/10 | (2006.01) |
| C10B 49/22 | (2006.01) |
| C10B 53/02 | (2006.01) |
| C10C 5/00 | (2006.01) |
| C07C 1/00 | (2006.01) |
| C07C 1/20 | (2006.01) |
| C07C 1/207 | (2006.01) |
| C07C 1/24 | (2006.01) |
| C07C 1/36 | (2006.01) |
| B01J 3/03 | (2006.01) |
| B01J 3/04 | (2006.01) |
| B01J 8/08 | (2006.01) |
| B01J 8/14 | (2006.01) |
| B01J 8/18 | (2006.01) |
| C10B 57/06 | (2006.01) |

(52) U.S. Cl.
CPC ............... *C10B 31/00* (2013.01); *B65G 53/16* (2013.01); *B65G 33/08* (2013.01); *C10B 49/10* (2013.01); *C10B 49/22* (2013.01); *C10B 53/02* (2013.01); *C10B 57/06* (2013.01); *C10C 5/00* (2013.01); *Y02E 50/14* (2013.01)

(58) Field of Classification Search
CPC .................. B01J 3/03; B01J 3/04; B01J 8/08; B01J 8/14; B01J 8/18; C07C 1/00; C07C 1/20; C07C 1/207; C07C 1/24; C07C 1/32; C07C 1/36
USPC .......... 422/164, 232, 292, 295; 585/240–242; 44/605–606; 202/85–86, 105–151
See application file for complete search history.

(56) References Cited

U.S. PATENT DOCUMENTS

| | | |
|---|---|---|
| 4,209,304 A | 6/1980 | Kessler et al. |
| 5,504,259 A | 4/1996 | Diebold et al. |
| 5,792,340 A | 8/1998 | Freel et al. |
| 8,003,835 B2 | 8/2011 | Yanik et al. |
| 8,015,932 B2 | 9/2011 | Eiteneer et al. |

(Continued)

FOREIGN PATENT DOCUMENTS

| | | |
|---|---|---|
| KR | 10-2011-0099272 | 9/2011 |
| WO | 2008101949 A1 | 8/2008 |

(Continued)

OTHER PUBLICATIONS

Raman, A. (2007). Materials Selection and Applications in Mechanical Engineering, Industrial Press, 512 pgs (Office action references pp. 97-100).*

(Continued)

*Primary Examiner* — Brian McCaig
(74) *Attorney, Agent, or Firm* — Hovey Williams LLP

(57) ABSTRACT

An improved biomass feed system and processes for transporting biomass to downstream processing locations are disclosed. The system uses a pressurized gas to assist in the transporting of the biomass to the conversion reactor.

21 Claims, 5 Drawing Sheets

(56) References Cited

U.S. PATENT DOCUMENTS

| | | |
|---|---|---|
| 8,043,400 B1 | 10/2011 | Stephens et al. |
| 8,083,900 B2 | 12/2011 | Lin |
| 2004/0063807 A1 | 4/2004 | Wang et al. |
| 2010/0113849 A1 | 5/2010 | Bartek et al. |
| 2010/0132258 A1 | 6/2010 | Linck et al. |
| 2010/0162625 A1 | 7/2010 | Mills |
| 2010/0242353 A1* | 9/2010 | Jovanovic et al. .............. 44/639 |
| 2011/0094147 A1 | 4/2011 | Bartek et al. |
| 2011/0114876 A1 | 5/2011 | Brady et al. |
| 2011/0139596 A1 | 6/2011 | Bartek et al. |
| 2011/0174597 A1 | 7/2011 | Bartek |
| 2011/0275868 A1* | 11/2011 | Prochazka et al. ............ 585/242 |

FOREIGN PATENT DOCUMENTS

| | | |
|---|---|---|
| WO | 2010102145 A1 | 9/2010 |
| WO | 2012068252 A1 | 5/2012 |
| WO | 2012088429 A2 | 6/2012 |

OTHER PUBLICATIONS

Notification of Transmittal of the International Search Report and Written Opinion for PCT Application No. PCT/US2013/049335, filed Jun. 3, 2013; Applicant, KiOR, Inc.; dated Oct. 17, 2013; 12 pages.

\* cited by examiner

BIOMASS FEED SYSTEM INCLUDING GAS ASSIST

FIELD OF THE INVENTION

The invention relates generally to the conversion of biomass into useful intermediates and/or end products. More particularly, the invention relates to an improved biomass feed system and processes for transporting biomass to a conversion reactor.

BACKGROUND OF THE INVENTION

With the rising costs and environmental concerns associated with fossil fuels, renewable energy sources have become increasingly important. The development of renewable fuel sources provides a means for reducing the dependence on fossil fuels. Accordingly, many different areas of renewable fuel research are currently being explored and developed.

With its low cost and wide availability, biomass has increasingly been emphasized as an ideal feedstock in renewable fuel research. Consequently, many different conversion processes have been developed that use biomass as a feedstock to produce useful biofuels and specialty chemicals. One of the useful products that may be derived from biomass is a liquid product commonly referred to as "bio-oil."

A common requirement of these different conversion processes is to deliver the biomass feedstock to a conversion reactor. Conventional biomass feed systems are often mechanically unreliable and provide poor distribution of the biomass in the conversion reactor. Therefore, there is a need for an improved biomass feed system that more effectively and reliably provides biomass to the conversion reactor.

SUMMARY OF THE INVENTION

In one embodiment of the present invention, a process for producing bio-oil is provided that includes the steps of (a) supplying a particulate biomass material to a gas mixing zone; (b) supplying a carrier gas to the gas mixing zone; (c) transporting the biomass material through a reducer located downstream of the gas mixing zone, where the reducer defines a flow pathway having a diminishing cross-sectional flow area; and (d) transporting the biomass material through a feed line and into a reaction zone. The feed line is located downstream of the reducer. The carrier gas is used to propel the biomass material during at least a portion of the transporting of step (d).

In another embodiment of the present invention, a process for producing bio-oil is provided that includes the steps of (a) supplying a particulate biomass material to one or more gas mixing zones; (b) supplying one or more carrier gas streams to the gas mixing zones; and (c) transporting the biomass material from the gas mixing zones into a reaction zone via first and second feed lines. The first and second feed lines supply the biomass to the reaction zone via respective first and second spaced reactor inlets. The carrier gas streams are used to propel the biomass material during at least a portion of the transporting of step (c).

In another embodiment of the present invention, a process for producing bio-oil is provided that includes the steps of (a) introducing a first quantity of biomass material into a first hopper; (b) transporting the first quantity of biomass material from the first hopper into a second hopper; (c) introducing a second quantity of biomass material into the first hopper; (d) pressurizing the second hopper with a gas while the first quantity of biomass material is located in the second hopper; (e) transporting the second quantity of biomass material from the second hopper to a pressurized feed system; (f) depressurizing the second hopper by releasing at least a portion of the gas from the second hopper; (g) routing at least a portion of the gas released in step (f) to the first hopper; and (h) using the gas routed from the second hopper in step (g) to at least partially purge oxygen from the second quantity of biomass material inside the first hopper.

In another embodiment of the present invention, a biomass conversion system is provided that includes a biomass source for providing a solid particulate biomass material; a carrier gas source for providing a carrier gas; one or more gas mixing zones coupled to the biomass source and the carrier gas source and configured to receive the biomass material from the biomass source and to receive the carrier gas from the carrier gas source; a biomass reactor comprising first and second spaced-apart reactor inlets; a first feed line providing fluid flow communication between the one or more gas mixing zones and the first reactor inlet; and a second feed line providing fluid flow communication between the one or more gas mixing zones and the second reactor inlet.

BRIEF DESCRIPTION OF THE FIGURES

Embodiments of the present invention are described herein with reference to the following drawing figures, wherein.

DETAILED DESCRIPTION

The following detailed description of the invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
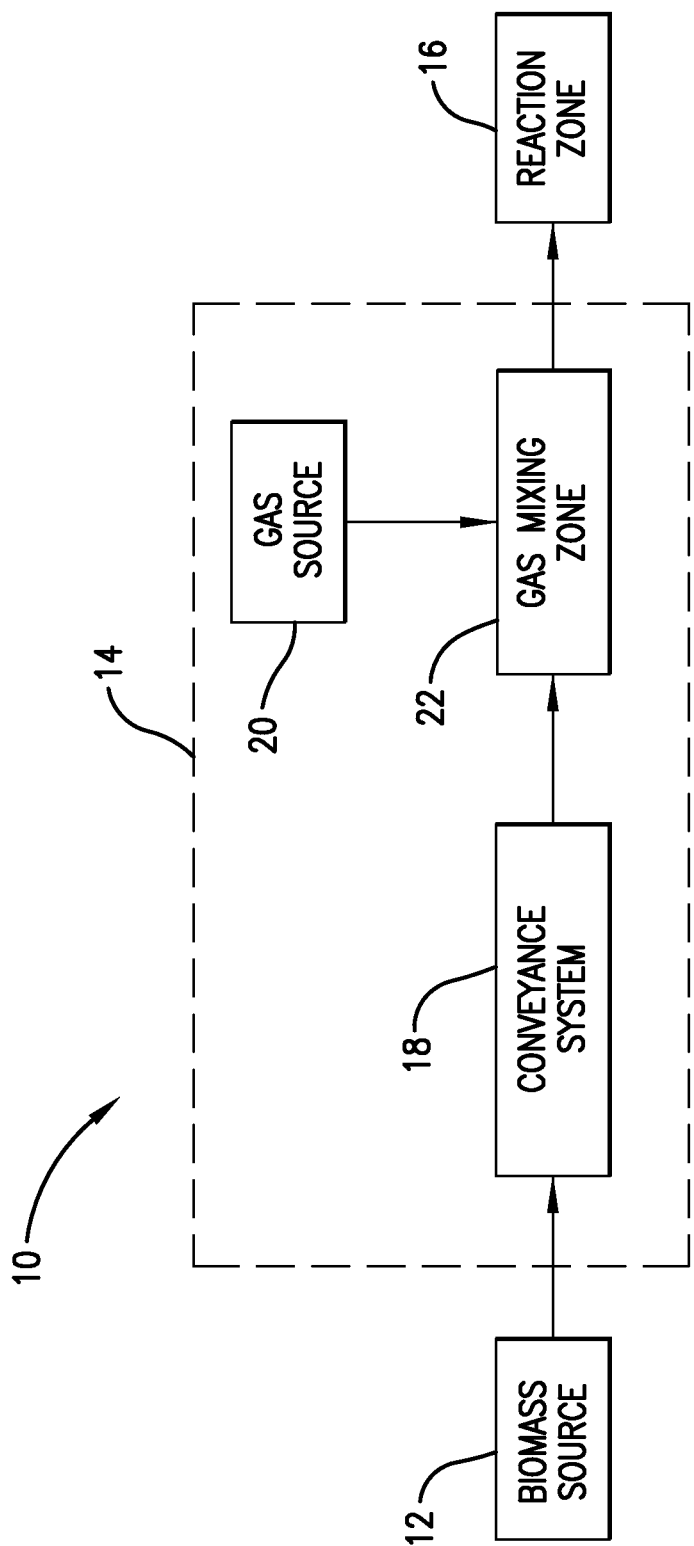
FIG. 1 is a schematic diagram of a biomass conversion system in accordance with one embodiment of the present invention.

FIG. 1 depicts a biomass conversion system 10 that includes a biomass source 12, a biomass feed system 14, and a reaction zone 16. It should be understood that the biomass feed system 14 shown in FIG. 1 is just one example of a system within which the present invention can be embodied. The present invention may find application in a wide variety of other systems where it is desirable to efficiently and effectively feed biomass into a processing location. The biomass conversion system 10 illustrated in FIG. 1 will now be described in detail.

The biomass conversion system 10 of FIG. 1 begins with the biomass source 12. The biomass source can be, for example, a hopper, storage bin, railcar, over-the-road trailer, or any other device that may hold or store biomass. The biomass material supplied by the biomass source 12 can be any type of biomass material capable of being converted to liquid and/or gaseous hydrocarbons (e.g, bio-oil). Generally, the biomass can be solid biomass materials comprising cellulosic materials, in particular ligno-cellulosic materials, because of the abundant availability of such materials and their low cost. The solid biomass material can comprise components selected from the group consisting of lignin, cellulose, hemicellulose, and/or combinations thereof. Suitable cellulose-containing materials can include, for example, algae, paper waste, and/or cotton linters. Examples of suitable ligno-cellulosic materials can include forestry waste such as wood chips, saw dust, pulping waste, and tree branches; agricultural waste such as corn stover, wheat straw, and bagasse; and/or energy crops such as eucalyptus, switch grass, and coppice. The biomass material may have an average particle size of at least 0.1 µm, at least 1 µm, or at least 10 and/or not more than 5 mm, not more than 2 mm, or not more than 1 mm.

The biomass material may undergo a number of pretreatments to facilitate the subsequent conversion reactions. Such pretreatments may include drying, roasting, torrefaction, demineralization, steam explosion, mechanical agitation, grinding, milling, debarking, and any combination thereof. The biomass pretreatments may occur prior to, within, and/or after the biomass enters the biomass feed system 14.

In one embodiment, it may be desirable to combine the biomass with a catalyst in the biomass feed system 14 prior to introducing the biomass into the reaction zone 16. Alternatively, the catalyst may be introduced directly into the reaction zone 16. The catalyst may be a fresh and/or a regenerated catalyst. The catalyst can be a heterogeneous cracking catalyst such as, for example, a solid acid, an amorphous silica-alumina, alumina phosphates, or a zeolite. Examples of suitable zeolites include ZSM-5, ZSM-11, ZSM-12, ZSM-18, ZSM-22, ZSM-23, zeolite-L, Mordenite, Beta, Ferrierite, zeolite-Y, or combinations thereof. Additionally or alternatively, the catalyst may comprise a super acid. Examples of suitable super acids include Nafion-H, sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases include layered double hydroxides, mixed metal oxides, hydrotalcite, clays, and combinations thereof. In yet another embodiment, the catalyst can also comprise an alumina, such as alpha-alumina.

In certain embodiments, the catalyst can be an equilibrium catalyst (E-cat) from a fluid catalytic cracking (FCC) unit of an oil refinery. This term refers to catalyst material that has, on average, circulated in the FCC unit for a considerable length of time. The term is used to distinguish fresh catalyst, which has not been exposed to the environment of the FCC unit, and which has much greater catalytic activity than the E-cat. This spent catalyst is a waste product from oil refineries, and as such, is abundantly available at low cost.

It should be noted that solid biomass materials generally contain minerals. It is recognized that some of these minerals, such as potassium carbonate, can have catalytic activity in the conversion of the biomass material. Even though these minerals are typically present during the chemical conversion taking place in the reaction zone 16, they are not considered catalysts.

Returning now to FIG. 1, biomass from the biomass source 12 is supplied to the biomass feed system 14. The biomass feed system 14 includes a conveyance system 18, a gas source 20, and a gas mixing zone 22. The conveyance system 18 provides biomass to the gas mixing zone 22, while the gas source 20 supplies a carrier gas to the gas mixing zone 22. In an alternative embodiment not depicted in FIG. 1, the biomass source supplies biomass directly to one or more gas mixing zones, while the gas source supplies a carrier gas to one or more gas mixing zones. The carrier gas can be any gas compatible with a biomass conversion system. In one embodiment, the carrier gas is substantially inert to the reaction carried out in the reaction zone 16. In certain embodiments, the carrier gas contains less than 20 volume percent oxygen, less than 10 volume percent oxygen, or less than 5 volume percent oxygen. In certain embodiments, the carrier gas can contain at least 50 volume percent nitrogen, at least 75 volume percent nitrogen, at least 90 volume percent nitrogen, at least 95 volume percent nitrogen, or at least 99 volume percent nitrogen. The weight ratio of the carrier gas to biomass material supplied to the gas mixing zone 106 can be at least 0.01:1, at least 0.05:1, at least 0.1:1, or at least 0.125:1 and/or not more than 1:1, not more than 0.5:1, not more than 0.25:1, or not more than 0.175:1.

The biomass feed system 14 transports the biomass material to the reaction zone 16. In certain embodiments, the biomass is introduced into the reaction zone 16 at a rate of at least 5,000 lbs./hr., at least 20,000 lbs./hr., or at least 40,000 lbs./hr. and/or not more than 250,000 lbs./hr., not more than 100,000 lbs./hr., or not more than 60,000 lbs./hr. In the reaction zone 16, biomass is subjected to a conversion process that produces useful intermediates and/or end products.

Figure 2:
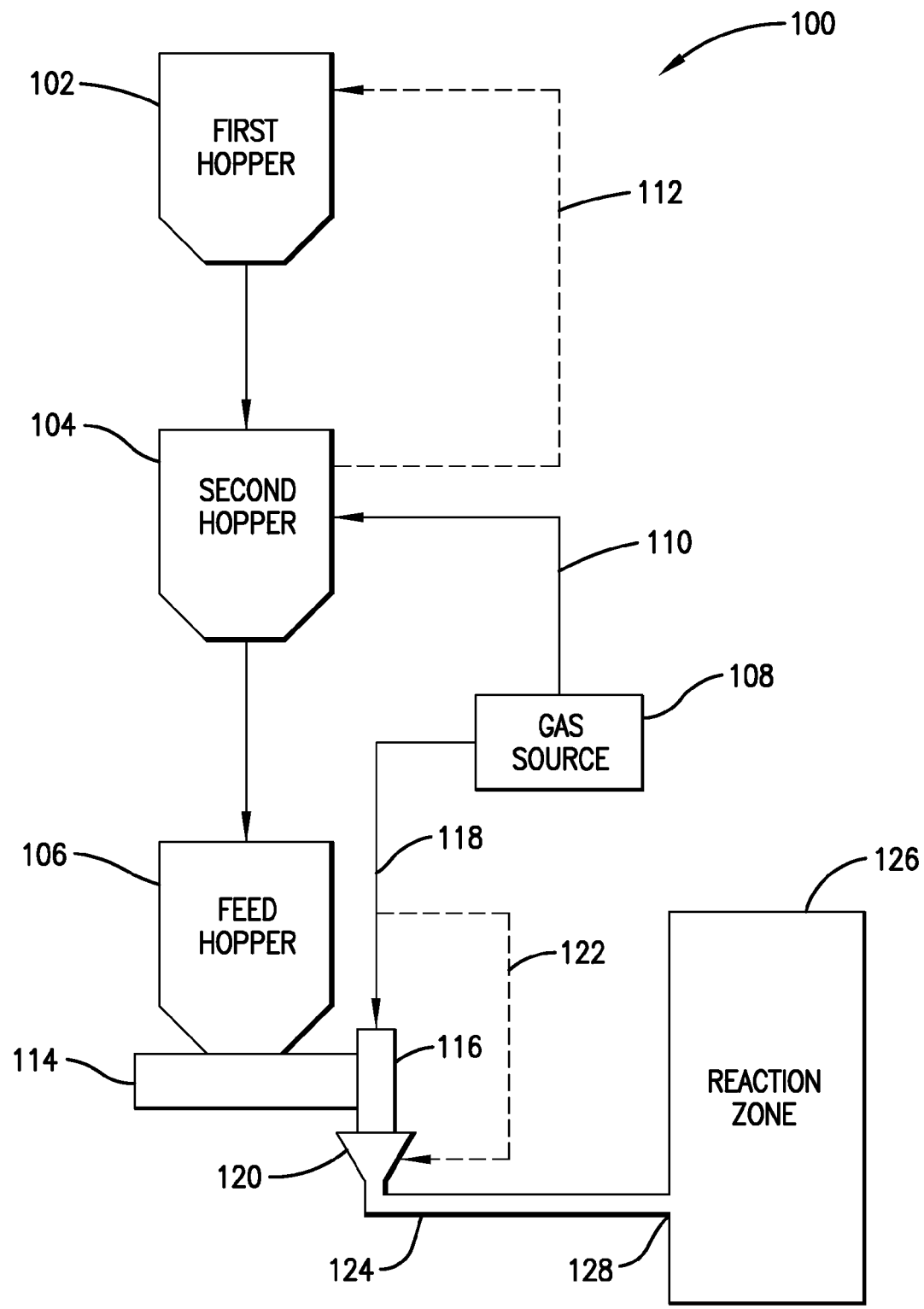
FIG. 2 is a schematic diagram of an exemplary biomass feed system in accordance with one embodiment of the present invention.

FIG. 2 provides a more detailed depiction of a biomass feed system 100 according to one embodiment of the present invention. The biomass feed system 100 of FIG. 2 includes a first hopper 102, a second hopper 104, and a feed hopper 106. The first hopper 102, second hopper 104, and feed hopper 106 can be any type of hopper capable of receiving and transporting biomass material at or above atmospheric pressure. In certain embodiments, some or all of the hoppers are lock hoppers. The first hopper 102 receives a biomass material from a biomass source and transports the biomass material to the second hopper 104. The particular method in which the biomass material is delivered to the second hopper 104 from the first hopper 102 can be any method known to one skilled in the art such as, for example, by providing a biomass transport line or by providing a gravity feed device. In certain embodiments, the biomass transport line is capable of maintaining an elevated pressure.

In certain embodiments, the second hopper 104 can be pressurized by a gas from a gas source 108 via a gas line 110 prior to transporting the biomass material to the feed hopper 106. The pressurized second hopper 104 can be depressurized by releasing the gas in any manner suitable for the proper operation of a feed system. In certain embodiments, all or a portion of the gas released by the second hopper 104 can be recycled, via a recycle line 112, to the first hopper 102. This recycled gas can be used to purge oxygen from other biomass material located inside the first hopper 102.

The biomass material is then transported from the second hopper 104 into the feed hopper 106. In an alternative embodiment not depicted in FIG. 2, the feed hopper 106 receives biomass material directly from a biomass source. The biomass material may be transported from the second hopper 104 or from the biomass source to the feed hopper 106 under atmospheric pressure or at elevated pressure. The internal volume of the feed hopper 106 can be any volume capable of containing the biomass material from the second hopper 104 or from the biomass source. For example, the internal volume of the feed hopper 106 can be at least the same volume, at least twice the volume, at least three times the volume, or at least five times the volume of the biomass material received from the second hopper 104 or from the biomass source. By having an internal volume larger than the biomass material received from the second hopper 104 or from the biomass source, the feed hopper 106 can transport biomass material downstream in a continuous manner.

The feed hopper 106 supplies the biomass material to the conveyance system 114. In an embodiment not depicted in FIG. 2, the conveyance system 114 receives biomass material directly from the second hopper 104. In one embodiment, the conveyance system 114 can include any type of mechanical conveyor capable of transporting the biomass material into a gas mixing zone 116. For example, the mechanical conveyor may be a screw conveyor, a belt conveyor, or a vibrating conveyor. In another embodiment, the conveyance system 114 can include a gravity feed device. In yet another embodiment, the conveyance system 114 includes a mechanical conveyor and a gravity feed device. In yet another embodiment, the conveyance system 114 can include more than one mechanical conveyer and/or more than one gravity feed device.

The conveyance system 114 transports the biomass material into the gas mixing zone 116, as depicted in FIG. 2. In alternative embodiments not shown in FIG. 2, the gas mixing zone 116 can receive biomass material directly from the second hopper 104 or the gas mixing zone 116 can receive biomass material directly from the feed hopper 106. The gas mixing zone 116 can receive a carrier gas from a carrier gas source 108, via a gas line 118. The gas mixing zone 116 can be any structure capable of providing sufficient volume to mix the carrier gas and the biomass material. In one embodiment, the carrier gas and biomass material are supplied to the gas mixing zone 116 via the same inlet. In another embodiment, the carrier gas and biomass material are supplied to the gas mixing zone 116 via separate inlets. In the gas mixing zone 116, the carrier gas mixes with the biomass material.

In certain embodiments, the carrier gas/biomass mixture is directed toward at least one reducer 120 which defines a flow pathway having a diminishing cross-sectional flow area. In certain embodiments, the carrier gas from the gas source 108 can be supplied via gas line 122 to the reducer 120 instead of, or in addition to being supplied to the gas mixing zone 116. When the carrier gas is introduced into the reducer 120, the reducer effectively operates as a part of, or all of the mixing zone 116. The reducer 120 has an inlet defining a first cross-sectional flow area ($A_i$) and an outlet defining a second cross sectional flow area ($A_o$). In certain embodiments, the ratio of $A_i$ to $A_o$ can be at least 1:1, at least 1.3:1, or at least 1.5:1 and/or not more than 20:1, not more than 15:1, or not more than 10:1.

The inner surface of the reducer 120 defines the flow pathway through the reducer 120. To facilitate the flow of the biomass material through the reducer 120, the inner surface of the reducer 120 can be provided with a smooth finish. In one embodiment, the inner surface of the reducer 120 is finished, for example, by electropolishing or mechanical polishing. In a preferred embodiment, the inner surface of the reducer 120 is electropolished. In certain embodiments, at least 50%, at least 75%, at least 90%, at least 95%, or at least 99% of the area of the inner surface of the reducer 120 has a root mean square (RMS) surface finish value of not more than 100 micro-inches, not more than 50 micro-inches, not more than 25 micro-inches, not more than 10 micro-inches, or not more than 5 micro-inches.

Returning now to FIG. 2, the carrier gas/biomass material mixture is transported from the reducer 120 into at least one feed line 124. In certain embodiments, the carrier gas/biomass mixture is transported from the reducer 120 into multiple feed lines. In one embodiment, carrier gas is used to propel the biomass material through the reducer 120 to the feed line 124. In another embodiment, gravity is used in conjunction with the carrier gas to facilitate the transportation of the biomass material through the reducer 120 to the feed line 124. In an embodiment not depicted in FIG. 2, the carrier gas/biomass mixture can be transported from the gas mixing zone 116 directly into the feed line 124 without passing through a reducer.

The feed line 124 can be any structure capable of receiving the carrier gas/biomass material mixture from the reducer 120 or the gas mixing zone 116. The cross-sectional area of the feed line 124 can vary depending upon the particular needs of the biomass feed system. Non-limiting values for the cross-sectional area of the feed line 124 can be at least 1 inch$^2$, at least 5 inches$^2$, or at least 10 inches$^2$ and/or less than 500 inches$^2$, less than 200 inches$^2$, or less than 50 inches$^2$. In certain embodiments, the cross-sectional area of the feed line 124 may not be uniform throughout. In one embodiment, inserts may be nested inside the feed line 124 to reduce its cross-sectional area and thereby increase the velocity of the biomass being transported.

In certain embodiments, the biomass can be transported through the feed line 124 at a biomass flux rate of at least 500 lbs./ft.$^2$/min., at least 1,500 lbs./ft.$^2$/min., or at least 3,000 lbs./ft.$^2$/min. and/or not more than 30,000 lbs./ft.$^2$/min., not more than 12,000 lbs./ft.$^2$/min., or not more than 6,000 lbs./ft.$^2$/min. The carrier gas/biomass material mixture is transported from the feed line 124 into a reaction zone 126 via a reactor inlet 128.

Figure 3:
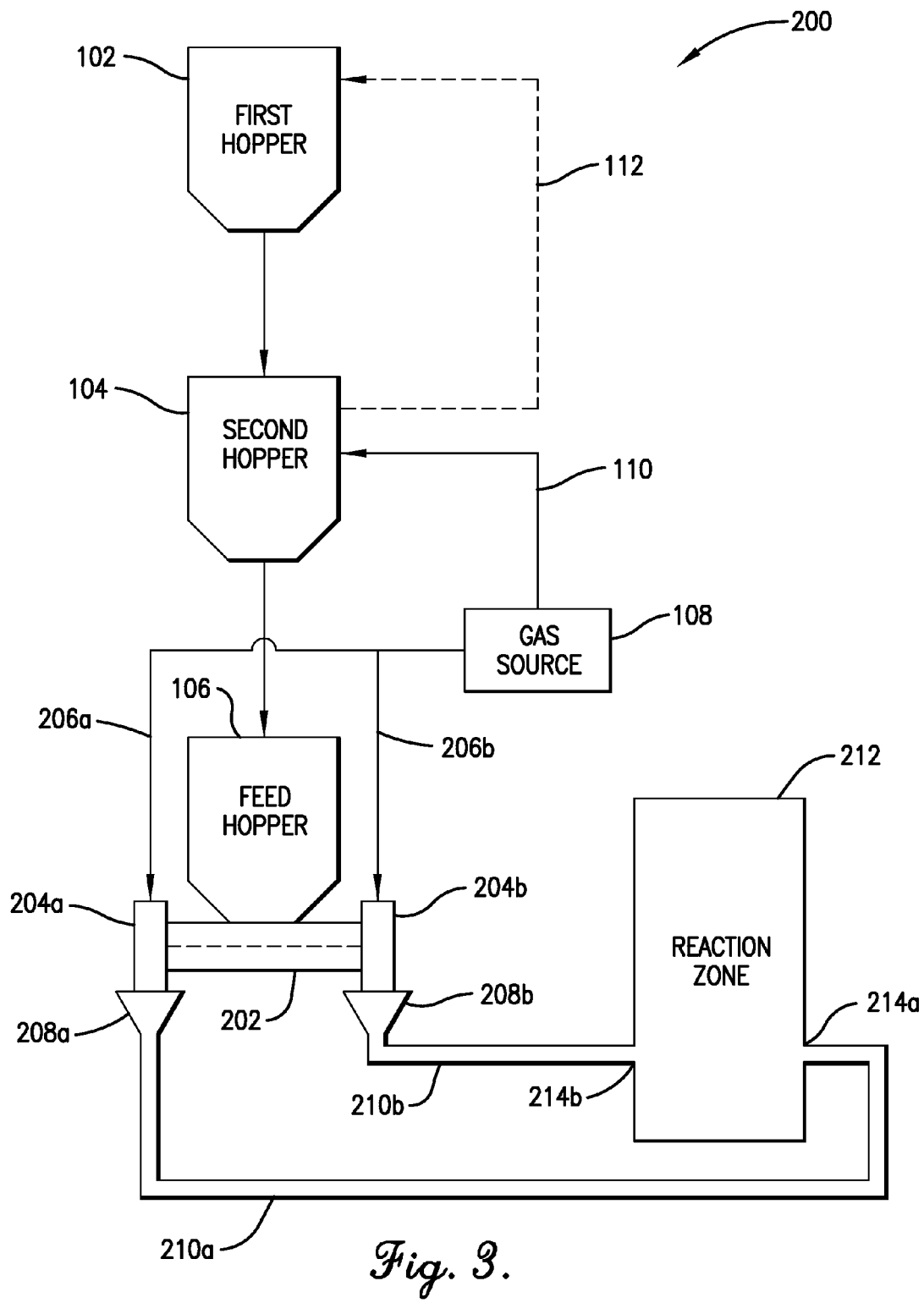
FIG. 3 is a schematic diagram of another exemplary biomass feed system in accordance with one embodiment of the present invention.

FIG. 3 depicts another embodiment of a biomass feed system configured in accordance with the present invention. It should be noted that the discussion pertaining to the function and parameters of components in the biomass feed system 100, as illustrated in FIG. 2, are transferable to similar components of the biomass feed system 200, depicted in FIG. 3.

The biomass system 200, as depicted in FIG. 3, includes one or more feed devices or one or more conveyors in its conveyance system 202. For example, in certain embodiments, the conveyance system 202 may contain two mechanical conveyors. In a preferred embodiment, the conveyance system 202 contains at least two screw conveyors, which can be positioned side-by-side. Each conveyor or feed device can transport a separate portion of biomass material to separate gas mixing zones 204a and 204b. Separate gas mixing zones 204a and 204b can also be supplied with carrier gas from gas source 108, via gas lines 206a and 206b, respectively. Separate gas mixing zones 204a and 204b can transport the carrier gas/biomass material mixture to separate reducers 208a and 208b, respectively. Reducers 208a and 208b can then transport the carrier gas/biomass mixture to feed lines 210a and 210b, respectively. In an embodiment not depicted in FIG. 3, the carrier gas/biomass mixture can be transported from the separate gas mixing zones 204a and 204b directly to the feed lines 210a and 210b, respectively. The feed lines 210a and 210b can then transport the carrier gas/biomass mixture to one or more reactors in the reaction zone 212 via reactor inlets 214a and 214b, respectively. In one embodiment, the reactor inlets 214a and 214b are separately spaced on the same reactor within the reaction zone 212. In another embodiment, the reactor inlets 214a and 214b are on separate reactors within reaction zone 212. The feed lines 210a and 210b can be placed at a location internal or external to the reaction zone 212. In other embodiments, there could be three, four, five, or more feed lines transporting the carrier gas/biomass mixture to the reaction zone 212 via separately spaced reactor inlets.

Figure 4B:
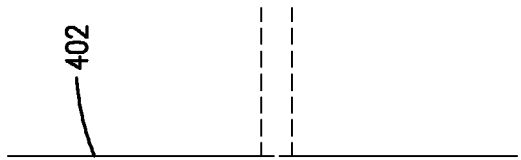
FIG. 4b illustrates other orientations of various reactor inlets on a reactor in accordance with one embodiment of the present invention.
Figure 4A:
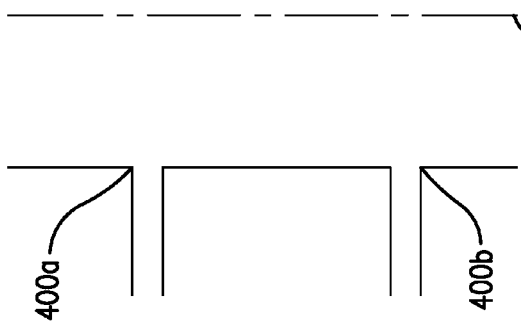
FIG. 4a illustrates the orientation of various reactor inlets on a reactor in accordance with one embodiment of the present invention.
Figure 4A:
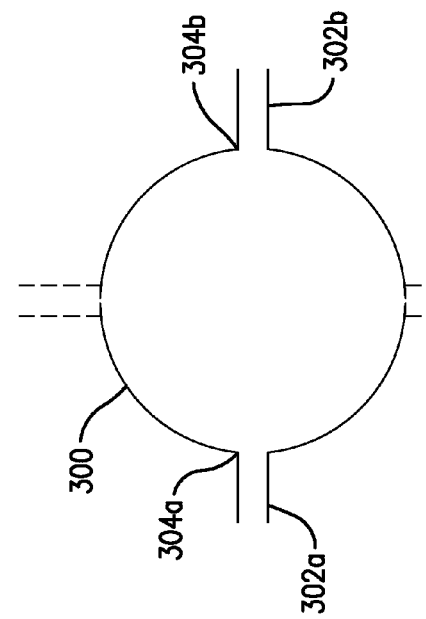

The spacing of reactor inlets can be important to effectively deliver the biomass material to a biomass conversion reactor. FIGS. 4a and 4b illustrate various embodiments depicting reactor inlet spacing on one reactor inside the reaction zone. These embodiments are not exclusive and may be combined.

FIG. 4a illustrates one embodiment with circumferential reactor inlet spacing on a biomass conversion reactor 300. Feed lines 302a and 302b are coupled to reactor inlets 304a and 304b, respectively. In this particular embodiment, the reactor inlets 304a and 304b are circumferentially spaced apart on the reactor 300. That is, the reactor inlets 304a and 304b are located at approximately the same vertical height on the reactor but spaced apart from one another. The circumferential spacing may be such that the reactor inlets 304a and 304b are on substantially opposite sides of the reactor 300. For example, in certain embodiments, the reactor inlets 304a and 304b may be spaced apart by more than 90 degrees, more than 120 degrees, or more than 140 degrees and/or less than 270 degrees, less than 240 degrees, or less than 220 degrees. Alternatively, the circumferential spacing may be such that the reactor inlets 304a and 304b are substantially on the same side of the reactor. For example, in certain embodiments, the reactor inlets 304a and 304b may be spaced apart by more than 1 degree, more than 30 degrees, or more than 50 degrees and/or and less than 180 degrees, less than 150 degrees, or less than 130 degrees. In other embodiments, which include more than two feed lines, the respective reactor inlets may be circumferentially spaced such that they are equidistant from one another. For example, if four reactor inlets were being used, the reactor inlets may be approximately 90 degrees from one another. Any circumferential spacing may be used to best suit a specific feed system and/or reactor design. Particularly, any circumferential spacing of reactor inlets that maximizes effective dispersion of the biomass material to one or more reactors is contemplated by this invention.

FIG. 4b illustrates another embodiment wherein reactor inlets 400a and 400b are vertically spaced apart on a reactor 402 along its vertical axis 404. For example, in certain embodiments, the reactor inlets 400a and 400b may be vertically spaced apart by at least 6 inches, at least 12 inches, or at least 24 inches and/or less than 144 inches, less than 120 inches, or less than 96 inches. Any amount of vertical spacing that can effectively disperse the biomass material inside the reactor 402 is contemplated by this invention. FIG. 4b further illustrates an embodiment where the reactor inlets are vertically and circumferentially spaced apart, as indicated by the dashed reactor inlet and feed line.

To mitigate any potential problems that may arise in a biomass feed system or in any downstream conversion processes, it may be advantageous to place additional components into the biomass feed system. In certain embodiments, one or more isolation valves are placed into the biomass feed system to isolate the biomass from the reaction zone. In one embodiment, at least one isolation valve is placed in one of the feed lines. An isolation valve does not necessarily have to be placed in a feed line in order to isolate biomass material from the reaction zone. For example, in other embodiments, one or more isolation valves can be placed in the conveyance system, one or more gas mixing zones, one or more reactor inlets, or any combination thereof. The specific number and location of the isolation valve(s) can be determined by one skilled in the art to provide the most efficient and effective biomass feed system. In a preferred embodiment, one or more isolation valves are in the feed line to isolate the gas mixing zone from the reaction zone.

In other embodiments, the biomass feed system may contain one or more pressure relief valves and/or vents to relieve pressure in the biomass feed system. For example, one or more pressure relief valves or vents may be placed in the conveyance zone, in one or more of the reducers, in one or more of the feed lines, or in one or more of the reactor inlets. Any number of pressure relief valves, vents, or a combination thereof may be placed in any number of locations throughout the biomass feed system, as best determined by one skilled in the art.

In certain embodiments, the biomass feed system may contain one or more sensors to monitor the biomass feed system. For example, the sensor may be a pressure sensor, a temperature sensor, and/or any other sensor that measures one or more parameters of interest to one skilled in the art. The sensors can be located at any point in the biomass feed system based on the particular parameters being monitored. In certain embodiments, the sensors can be coupled to the conveyance system, one or more gas mixing zones, one or more reactor inlets, or any combination thereof. The sensors can be configured to relay sensed information to a person or an automated control system.

Figure 5:
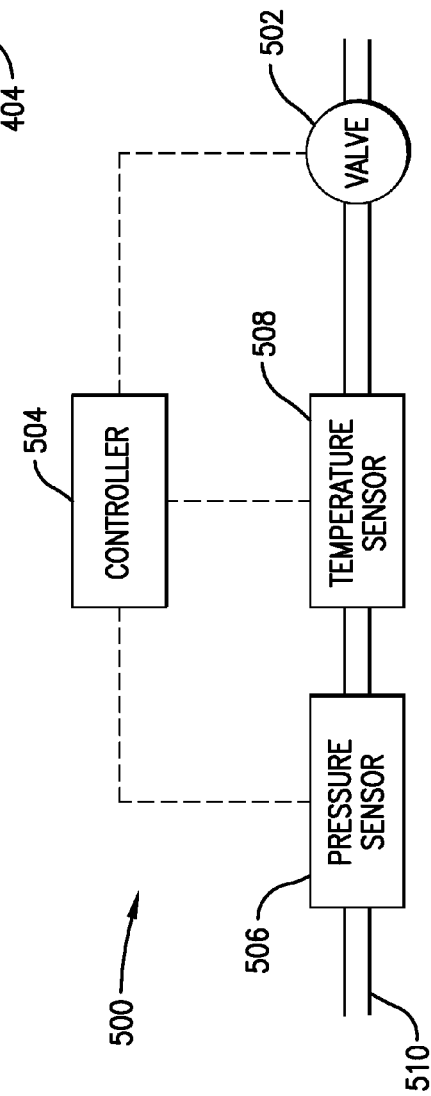
FIG. 5 is a schematic diagram of a control system on a feed line in accordance with one embodiment of the present invention.

FIG. 5 illustrates one embodiment where the biomass feed system includes a control system 500. The control system 500 includes an isolation valve 502 and sensors 506 and 508, all coupled to a controller 504. As depicted in FIG. 5, the sensors 506 and 508 and the isolation valve 502 are connected to a biomass feed line 510.

The controller 504 can be any type of controller capable of receiving sensed information from the sensors 506 and 508 and capable of causing the isolation valve 502 to open and/or close. The sensors 506 and 508 sense parameters of the biomass feed system and communicate that sensed information to the controller 504. In one embodiment, the controller 504 can cause the isolation valve 502 to open or close when the sensed parameters exceed a maximum preset value. In another embodiment, the controller 504 communicates the sensed parameters to a person or other system where the person or other system is required to cause the controller to open or close the isolation valve 502.

In certain embodiments, the biomass feed system may be part of a bio-oil production system. In the bio-oil production system 600 depicted in FIG. 6, the biomass feed system 602 delivers biomass to a reaction zone 604. The reaction zone 604 can facilitate different chemical conversion reactions such as fast pyrolysis, slow pyrolysis, liquefaction, gasification, or enzymatic conversion. The reaction zone 604 can contain, for example, a fluidized bed reactor, a cyclone reactor, an ablative reactor, or a riser reactor.

In one embodiment, the reaction zone 604 contains a riser reactor and the conversion reaction can be fast pyrolysis. More specifically, fast pyrolysis may include catalytic cracking. As used herein, "pyrolysis" refers to the thermochemical conversion of biomass caused by heating the feedstock in an atmosphere that is substantially free of oxygen. In one embodiment, pyrolysis is carried out in the presence of an inert gas, such as nitrogen, carbon dioxide, and/or steam. Alternatively, pyrolysis can be carried out in the presence of a reducing gas, such as hydrogen, carbon monoxide, or noncondensable gases recycled from the biomass conversion process, and/or any combination thereof.

Fast pyrolysis is characterized by short residence times and rapid heating of the biomass material. The residence times of the fast pyrolysis reaction can be, for example, less than 10 seconds, less than 5 seconds, or less than 2 seconds. Fast pyrolysis may occur at temperatures of at least 200° C., at least 250° C., or at least 300° C. and/or less than 1,000° C., less than 800° C., or less than 600° C.

Figure 6:
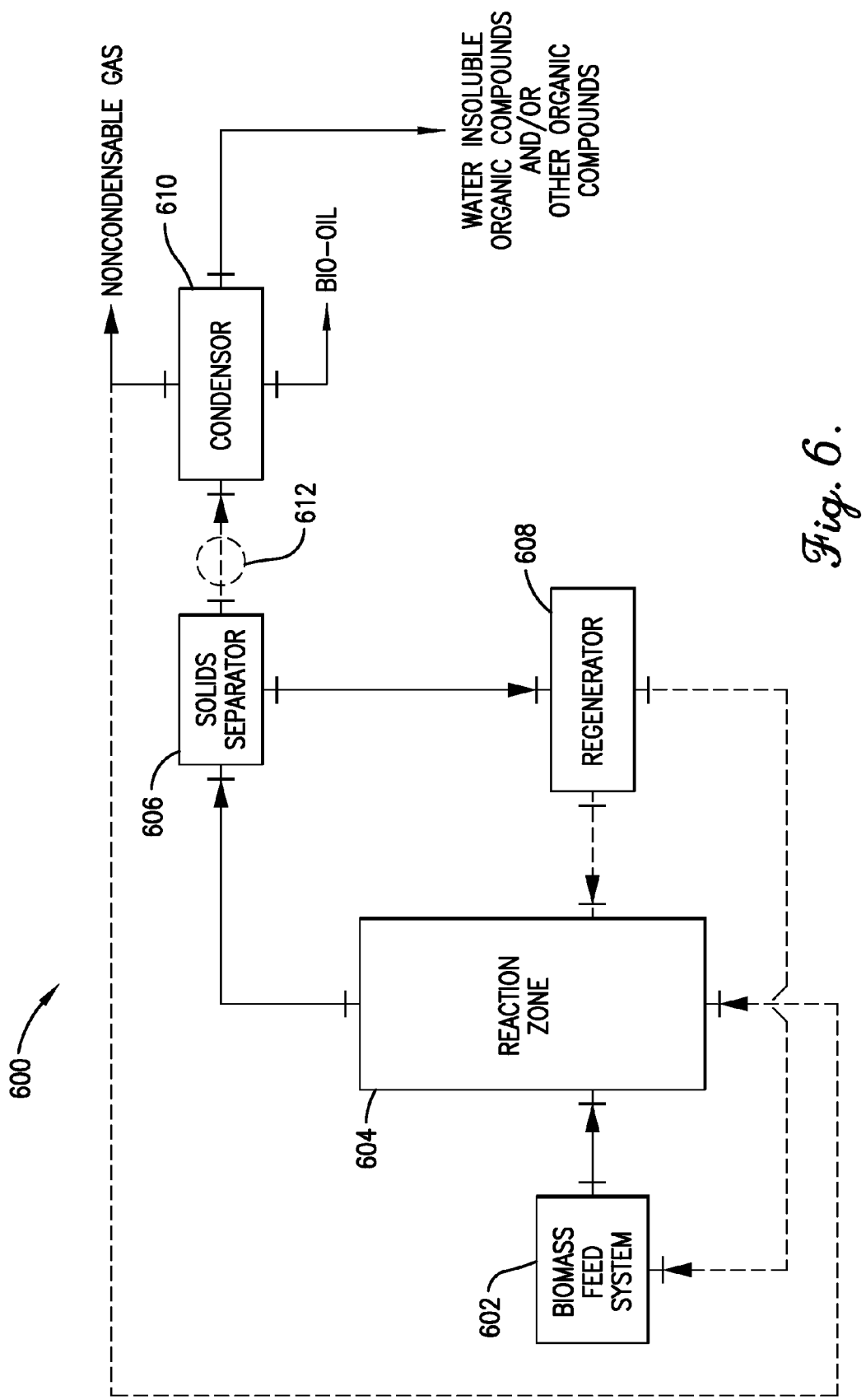
FIG. 6 is a schematic diagram of more detailed biomass conversion system in accordance with one embodiment of the present invention.

The product exiting the reaction zone 604 generally comprises gas, vapors, and solids. In the case of fast pyrolysis, the solids in the product exiting the conversion reaction generally comprise particles of char, ash, and/or catalyst. As depicted in FIG. 6, the product from the reaction zone 604 can be introduced into a solids separator 606. The solids separator 606 can be any conventional device capable of separating solids from gas and vapors such as, for example, a cyclone separator or a gas filter. The solids separator 606 removes a substantial portion of the solids (e.g., spent catalysts, char, and/or heat carrier solids) from the reaction product. The solid particles recovered in the solids separator 606 are introduced into a regenerator 608 for regeneration, typically by combustion. After regeneration, the hot regenerated solids can be reintroduced directly into the reaction zone 604 and/or combined with the biomass feed system 602 upstream of the reaction zone 604.

The remaining gas and vapor conversion products from the solids separator 606 are introduced into a condenser 610. Alternatively, the gas and vapor conversion products from the solids separator 606 may be routed through a cooling mechanism 612 for reducing the temperature of the condensable vapor conversion products prior to being introduced into the condenser 610. The cooling mechanism 612 may be any device known in the art that may cool the gas and vapor conversion products. The cooling mechanism 612 can, for example, be a heat exchanger.

The condenser 610 condenses at least a portion of the remaining conversion products into a bio-oil stream and a water insoluble organic compounds and/or other organic compounds stream. Additionally, any noncondensable gases produced in condenser 610 may also be removed from condenser 610 as a separate stream. At least a portion of the removed noncondensable gases may be recycled as a lift gas for use in the reaction zone 604.

It is the inventor's intent to rely on the Doctrine of Equivalents to determine and assess the reasonably fair scope of the present invention as it pertains to any processes and systems not materially departing from but outside the literal scope of the invention as set forth in the following claims.

What is claimed is:

1. A process for producing bio-oil, said process comprising:
    (a) supplying a particulate biomass material to a hopper, wherein said hopper is pressurized via a gas source;
    (b) supplying the particulate biomass material from said hopper to a gas mixing zone;
    (c) supplying a carrier gas via the gas source to said gas mixing zone;
    (d) transporting said biomass material through a reducer located downstream of said gas mixing zone, wherein said reducer defines a flow pathway having a diminishing cross-sectional flow area; and
    (e) transporting said biomass material through a feed line and into a reaction zone, wherein said feed line is located downstream of said reducer,
    wherein said carrier gas is used to propel said biomass material during at least a portion of said transporting of step (e).

2. The process according to claim 1, wherein said reducer defines a reducer inlet and a reducer outlet, wherein said reducer inlet defines a first cross-sectional flow area ($A_i$) and said reducer outlet defines a second cross-sectional flow area ($A_o$), wherein the ratio of $A_i$ to $A_o$ is at least 1.3:1.

3. The process according to claim 1, wherein said reducer presents an inner surface defining said flow pathway, wherein at least 75 percent of the area of said inner surface has a root mean square (RMS) surface finish value of not more than 50 micro-inches.

4. The process according to claim 3, wherein said inner surface is electropolished.

5. The process according to claim 1, wherein said supplying of step (b) includes transporting said biomass material through a mechanical conveyance system located upstream of said gas mixing zone.

6. The process according to claim 5, wherein said mechanical conveyance system comprises a screw conveyor.

7. The process according to claim 1, wherein said carrier gas is used to propel said biomass material during at least a portion of said transporting of step (d).

8. The process according to claim 7, wherein gravity is used in conjunction with said carrier gas to facilitate said transporting of step (d).

9. The process according to claim 1, wherein said carrier gas comprises less than 20 volume percent oxygen.

10. The process according to claim 1, wherein said biomass material is transported through said feed line at a biomass flux rate of at least 500 lbs/ft$^2$/min and not more than 30,000 lbs/ft$^2$/min, wherein said biomass material is introduced into said reaction zone at a rate of at least 5,000 lbs/hr and not more than 250,000 lbs/hr.

11. The process according to claim 1, further comprising using at least one isolation valve to selectively isolate said gas mixing zone from said reaction zone.

12. The process according to claim 11, further comprising: (i) using at least one sensor to monitor temperature and/or pressure in said feed line; and (ii) using a controller operably coupled to said sensor and said isolation valve to close said isolation valve when the temperature and/or pressure in said feed line exceed a preset maximum value.

13. The process according to claim 1, wherein said biomass material comprises a ligno-cellulosic material.

14. The process according to claim 1, further comprising subjecting said biomass material to a pyrolysis reaction in said reaction zone.

15. A process for producing bio-oil, said process comprising the steps of:
    a) supplying a particulate biomass material to one or more gas mixing zones;
    b) supplying one or more carrier gas streams to said gas mixing zones; and
    c) transporting said biomass material from said gas mixing zones into a reaction zone via first and second feed lines, wherein said first and second feed lines supply said biomass to a common reactor within said reaction zone via respective first and second spaced reactor inlets, and wherein said first and second reactor inlets are vertically and/or circumferentially spaced from one another on said common reactor such that said inlets are in fluid communication via said common reactor,
    wherein said carrier gas streams are used to propel said biomass material during at least a portion of said transporting of step (c).

16. The process according to claim 15, wherein step (a) includes using at least one mechanical conveyor and/or at least one gravity feed device to supply said biomass material to said gas mixing zones.

17. The process according to claim 15, wherein said one or more gas mixing zones comprises at least two separate gas mixing zones, each being supplied with one of said carrier gas streams.

18. The process according to claim 17, wherein step (a) includes using at least two mechanical conveyors, each supplying said biomass material to one of said gas mixing zones.

19. The process according to claim 18, wherein said mechanical conveyors are screw conveyors.

20. The process according to claim 15, wherein said particulate biomass material comprises a ligno-cellulosic material, wherein said reaction zone comprises a pyrolysis reactor.

21. The process according to claim 15, wherein said biomass material is transported through said feed line at a biomass flux rate of at least 500 lbs/ft$^2$/min and not more than 30,000 lbs/ft$^2$/min, wherein said biomass material is introduced into said reaction zone at a rate of at least 5,000 lbs/hr and not more than 250,000 lbs/hr.

\* \* \* \* \*